Patented Feb. 2, 1954

2,668,168

UNITED STATES PATENT OFFICE 2,668,168

CELLULOSE TRISALKYLCARBAMATES AND PROCESS OF MAKING THE SAME

Josef Pikl, Glassboro, N. J., assignor to E. I. du Pont de Nemours & Company, Wilmington, Del., a corporation of Delaware No Drawing. Application June 1, 1951, Serial No. 229,547

9 Claims. (Cl. 260—224)

This invention relates to novel derivatives of cellulose. It is an object of this invention to produce novel, organic-solvent soluble hydrophobic derivatives of cellulose having film-forming, coating and other industrially useful properties. It is a further object of this invention to provide a process for producing said derivatives. Various other objects and achievements of this invention will appear as the description proceeds.

It is known to form aryl carbamates of cellulose by reacting cellulose with aryl isocyanates, for instance phenyl isocyanate. Reaction has been brought about by bringing the two substances together in an organic tertiary base, for instance pyridine at room or moderately elevated temperature. Complete reaction appears to take place under these conditions, the cellulosic material loses its fibrous structure, and the product appears to be a homogeneous solution of the tris-carbamate in pyridine.

Suggestions have also been made in the literature to apply this process to the production of alkyl carbamate derivatives of cellulose, but practical attempts to that effect have failed. In J. A. C. S., vol. 65, page 831, Hearon et al. report that cotton linters and regenerated cellulose exhibited little or no reaction with methyl and ethyl isocyanates, although phenyl and α-naphthyl isocyanates reacted readily under the same conditions and led to trisubstituted derivatives.

The same authors also teach that it is possible to esterify with alkyl isocyanates (in other words, transform into carbamate radicals) the free OH groups of partially hydrolyzed cellulose acetate material. But attempts to completely esterify such free OH groups were unsuccessful; furthermore, it is obvious that under these conditions a triscarbamate could not under any conditions be obtained, because the initial acetate material, being only partially hydrolyzed, necessarily contains some acetate-blocked OH groups.

I have now found that full esterification of cellulose, natural or regenerated, by the aid of alkyl isocyanates may be achieved by heating the former with a fairly large excess of the latter dissolved in dimethyl formamide at a temperature not less than 80° C. and not over 160° C. Furthermore, I have found that the products thus obtained possess commercially interesting physical properties. Thus, they are soluble in many organic solvents, particularly dimethyl formamide, and may be formed, by extrusion molding from such solutions, into films or filaments. The films are transparent and hydrophobic, and have potential utility in the field of transparent wrapping materials. The filaments may be spun and woven or subjected to other processes for producing yarn and textile materials.

I also find that the mentioned films and filaments may have their physical properties modified by treatment with aqueous formaldehyde solutions. In this fashion, for instance, they may be transformed into products which are no longer soluble in organic solvents, which of course increases their practical value in the aforementioned fields.

The solutions of my novel compounds in dimethyl formamide or other organic solvents, or aqueous dispersions of said compounds, may also be used as treating agents for textile fiber to impart thereto water-repellent properties.

Other promising uses, in view of their physical characteristics are in producing lacquers, sizes and other fiber-finishes, paper coatings, etc.

The alkyl isocyanates which I find usable in my invention are compounds of the formula R—NCO, wherein R represents an alkyl radical of not less than 2 C-atoms.

Methyl-isocyanate may also be reacted by this process, but the cellulosic triscarbamate obtained therefrom does not dissolve in those organic solvents which dissolve the higher trisalkylcarbamates.

On the upper end, R is limited only by the solubility of the isocyanate in dimethyl formamide, and may possess as high as 18 or more C-atoms.

Accordingly, the novel products of this invention may be expressed by the general formula

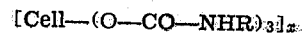

$$[\text{Cell}—(\text{O}—\text{CO}—\text{NHR})_3]_x$$

wherein "Cell" represents the residue $C_6H_7O_2$ of the initial $C_6H_{10}O_5$ unit of the cellulose molecule (which may be written $C_6H_7O_2 \cdot (OH)_3$), R represents an alkyl radical having from 2 to 18 or more C-atoms, while $x$ represents the unknown index of polymerization of natural or regenerated cellulose.

By large excess hereinabove, I mean using from 6 to 9 moles of the alkyl isocyanate for each $C_6H_{10}O_5$ unit of the cellulose. It will be noted that only 3 of these moles are expected to react. The quantity of dimethyl formamide should preferably be sufficient to form a stirrable reaction mass throughout the reaction.

The reaction may be carried out under atmospheric pressure or under autogenous pressure (by conducting the reaction in a sealed vessel). Furthermore, I have found that the rate of reaction may be considerably accelerated by subjecting the cellulose first to a treatment with a dilute aqueous solution of an alkali-metal hydroxide. Concentrations of less than 1% NaOH at room temperature are generally sufficient and some improvement is noticeable even with a concentration of 0.01%, from which I conclude that the effect of the alkali treatment is in the nature of an activation or catalysis. It will be noted that the strength of the alkali above indicated is insufficient to produce perceptible mercerization of the cellulose.

Without limiting my invention, the following examples are given to illustrate my preferred mode of operation. Parts mentioned are by weight.

Example 1

The water in 17.5 g. of a white cotton gabardine fabric (calculated to give 0.10 mol of dry cellulose on basis of the $C_6H_{10}O_5$ unit) was removed by adding 150 ml. of benzene and then distilling the azeotrope. 500 cc. of dimethyl formamide was added, and the benzene was removed by distillation. Then 191 g. (0.65 mol) of octadecylisocyanate were added, and the mixture was heated for 5 hours to 125° to 130° C., at atmospheric pressure. The fabric lost its structure and disintegrated to a pulpy mass. The solvent and excess isocyanate were washed out by hot acetone. The dried pulpy residue was extracted with boiling toluene, and yielded a toluene-soluble fraction which contained 3.95% nitrogen. Cellulose trisoctadecyl-carbamate has a calculated value of 4.02% nitrogen.

A clear film of this material, obtained by evaporating a toluene solution thereof, was not affected in any observable manner when it was placed in water for 48 hours.

Example 2

Six grams of finely shredded cotton gabardine fabric (0.037 mol as glucose unit) were treated for 1 hour with 100 cc. of a 0.2% solution of sodium hydroxide at room temperature, and then filtered. The wet material was dried by distillation with benzene, and the benzene was replaced by 150 cc. of dimethylformamide. At 40° C., 24 g. of ethyl isocyanate (0.339 mol) were added, and the mixture was heated in a steel bomb at 125° C. for 1 hour. The reaction mass, which was a very viscous liquid on cooling, was diluted with 4 parts of methyl-ethyl-ketone containing an excess of ammonia and methanol, to destroy any unreacted isocyanate. The filtered mixture was poured into water. The precipitated cellulose carbamate was dried and purified by solution in methyl alcohol and reprecipitation with water. The nitrogen analysis was 11.8%; the calculated value for cellulose trisethylcarbamate is 11.4%. The product was found soluble in methyl isobutyl ketone, methyl ethyl ketone, methyl alcohol, ethyl acetate, chloroform, and dimethyl formamide.

Clear films were cast from solvents such as a mixture of 4 parts of acetone and 1 part of methyl-isobutyl-ketone. These films were strong and not excessively brittle. Very pliable films were obtained by adding 20% to 50% of dioctyl-phthalate (by weight of the carbamate), and these films were not affected by water (such as hazing or swelling) in any observable way. By treatment with aqueous formaldehyde, the films became insoluble in solvents in which they were formerly soluble.

Example 3

In a solution of 0.8 g. of sodium hydroxide in 400 cc. of water were placed 23 g. (0.142 mol as glucose unit) of dry regenerated cellulose (prepared by the method of Malm and Fordyce described in Ott's "Cellulose and Cellulose Derivatives," page 670). The mixture was allowed to stand 1 hour at room temperature, and the cellulose swelled. The alkali-treated cellulose was filtered, and water was removed from the wet material by distillation with benzene. 600 cc. of dimethyl formamide were added, and the benzene together with about 90 cc. of dimethyl formamide were distilled off. The slurry was then reacted with 92.8 g. (1.3 mols) of ethyl isocyanate in a rocker bomb at 125° C. for 2 hours. Concentrated ammonium hydroxide and methanol were added to destroy unreacted ethyl isocyanate.

The brown viscous liquid was filtered, a liter of methyl-ethyl-ketone was added, and the resulting solution was poured into 10 liters of rapidly stirred water. The fibrous white precipitate was collected, washed with water, and dried first in air, and then at 80° C. for 6 hours. The cellulose trisethylcarbamate gave a nitrogen analysis of 11.67%. Theory is 11.4%.

It was found soluble in acetone, methanol, methyl-ethyl-ketone, and dimethyl formamide.

It will be understood that the details of the above examples may be varied within wide limits, within the skill of those engaged in this art. Thus, inasmuch as many of the practical uses of my novel compounds may be achieved by starting with an organic solution thereof, it is not necessary to separate the reaction product from the reaction mass. Instead, the excess of alkyl isocyanate may be removed by distillation, or it may be transformed into an innocuous compound by adding water, an alcohol or an amine, and the residual solution of cellulose trisalkylcarbamate in dimethyl formamide may be used directly for producing films, filaments, etc.

I claim as my invention:

1. Cellulose trisalkylcarbamates wherein the three alkyl radicals are alike, each having from 2 to 18 C-atoms in a straight chain, said compounds being characterized by being soluble in dimethyl formamide and yielding solutions which may be evaporated to form continuous films.

2. Cellulose trisethylcarbamate.

3. Cellulose trisoctadecylcarbamate.

4. A process for producing cellulose trisalkyl carbamates, which comprises reacting 1 mol of cellulose (on basis of $C_6H_{10}O_5$) with from 6 to 9 mols of an alkyl isocyanate having from 2 to 18 C-atoms in the alkyl radical, the reaction being effected by heating the reactants together in a sufficient quantity of dimethyl formamide to form a stirrable reaction mass, at a temperature not less than 80° C., and not exceeding 160° C.

5. A process as in claim 4, the cellulose being treated with an aqueous solution of an alkali-metal hydroxide of a strength insufficient to produce perceptible mercerization, and dried, prior to reaction with the alkyl isocyanate.

6. A process for producing a cellulose trisalkyl-carbamate, which comprises reacting 1 mole of cellulose (on basis of $C_6H_{10}O_5$) with from 6 to 9 moles of octadecyl isocyanate, the reaction being effected by heating the reactants together at about 125° C. in a quantity of dimethyl formamide sufficient to form a stirrable reaction mass.

7. A process as in claim 6, the cellulose being treated with an aqueous solution solution of sodium hydroxide of a strength between 0.01 and 1%, and dried, prior to reaction with said octadecyl isocyanate.

8. A process for producing a cellulose trisalkylcarbamate, which comprises reacting 1 mole of cellulose (on basis of $C_6H_{10}O_5$) with from 6 to 9 moles of ethyl isocyanate, the reaction being effected by heating the reactants together at about 125° C. in a sealed vessel and in a quantity of dimethyl formamide sufficient to form a stirrable reaction mass.

9. A process as in claim 8, the cellulose being treated with an aqueous solution of sodium hydroxide of a strength between 0.01 and 1%, and dried, prior to reaction with said ethyl isocyanate.

JOSEF PIKL.

References Cited in the file of this patent

UNITED STATES PATENTS

| Number | Name | Date |
|---|---|---|
| 1,357,450 | Goissedet | Nov. 2, 1920 |
| 1,991,107 | Malm et al. | Feb. 12, 1935 |
| 2,284,896 | Hanford et al. | June 2, 1942 |
| 2,303,364 | Schirm | Dec. 1, 1942 |
| 2,339,193 | Hanford | Jan. 25, 1944 |
| 2,536,634 | Fraizy et al. | Jan. 2, 1951 |

OTHER REFERENCES

Hearon et al.: J. A. C. S., vol. 65 (1943), pages 829–33.